(12) United States Patent
Mildner

(10) Patent No.: US 8,376,454 B2
(45) Date of Patent: Feb. 19, 2013

(54) REAR UNDERBODY FOR A VEHICLE

(75) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 13/153,201

(22) Filed: Jun. 3, 2011

(65) Prior Publication Data

US 2011/0298246 A1 Dec. 8, 2011

(30) Foreign Application Priority Data

Jun. 8, 2010 (DE) .................. 10 2010 023 075

(51) Int. Cl.
*B60J 7/00* (2006.01)
(52) U.S. Cl. .............................. 296/193.08; 296/193.07
(58) Field of Classification Search ............. 296/193.07, 296/193.08, 203.04, 187.11
See application file for complete search history.

(56) References Cited

U.S. PATENT DOCUMENTS

| | | | |
|---|---|---|---|
| 3,054,636 A | 9/1962 | Wessells, III | |
| 3,759,540 A * | 9/1973 | Olson | 280/784 |
| 4,469,368 A | 9/1984 | Eger | |
| 4,836,600 A * | 6/1989 | Miyazaki et al. | 296/193.07 |
| 5,110,177 A | 5/1992 | Akio | |
| 5,619,784 A * | 4/1997 | Nishimoto et al. | 29/430 |
| 6,234,568 B1 * | 5/2001 | Aoki | 296/203.04 |
| 2005/0046239 A1 | 3/2005 | Nakamura et al. | |
| 2005/0104356 A1 * | 5/2005 | Vincenti | 280/795 |
| 2009/0289476 A1 | 11/2009 | Bufe et al. | |
| 2010/0072786 A1 | 3/2010 | Koyama et al. | |

FOREIGN PATENT DOCUMENTS

| | | |
|---|---|---|
| DE | 742977 C | 6/1944 |
| DE | 2408548 A1 | 8/1975 |
| DE | 3114379 A1 | 11/1982 |
| DE | 20023723 U1 | 10/2005 |
| EP | 1640252 A1 | 3/2006 |
| JP | 2006096184 A | 4/2006 |
| JP | 2007296932 A | 11/2007 |

OTHER PUBLICATIONS

German Patent Office, German Search Report for Application No. 102010023075.8, dated Feb. 15, 2011.
British Patent Office, British Search Report for Application No. 1108744.2, dated Sep. 16, 2011.

* cited by examiner

*Primary Examiner* — Joseph Pape
(74) *Attorney, Agent, or Firm* — Ingrassia Fisher & Lorenz, P.C.

(57) ABSTRACT

A rear underbody is provided for a vehicle with a rear frame structure, a floor structure forming the floor for the footwell of the vehicle and with a termination structure delimiting the footwell to the rear. It is provided that the rear frame structure extends at least partially forward and beyond the termination structure.

14 Claims, 5 Drawing Sheets

REAR UNDERBODY FOR A VEHICLE

CROSS-REFERENCE TO RELATED APPLICATION

This application claims priority to German Patent Application No. 102010023075.8, filed Jun. 8, 2010, which is incorporated herein by reference in its entirety.

TECHNICAL FIELD

The technical field relates to a rear underbody or a vehicle with a rear frame structure, a floor structure forming the floor for the footwell of the vehicle and with a termination structure delimiting the footwell to the rear.

BACKGROUND

An underbody of the body is usual with vehicles, particularly motor vehicles. Such an underbody is usually realized with so-called small cars as well as with vehicles of larger vehicle classes.

As part of a cost-effective manufacture of vehicles, particularly small passenger cars, the aim is that as many parts and components of the body structure of the vehicle as possible can be used from the next larger vehicle class when developing new models. A further aim is that with the manufacture of the vehicle the assembly sequence, as already exists with the manufacture of vehicles of the next larger vehicle class, is retained. The vehicles can then be constructed on the production line for vehicles of the next larger vehicle class.

Such a cost-effective manufacture of the vehicles is countered in that many parts and components for vehicles of the next larger vehicle class are not suitable for use with a smaller vehicle, since these have dimensions that are too large. For example, the side members of the rear frame structure for a vehicle of the next larger vehicle class are usually longer than the side members of the rear frame structure of a small car.

Therefore, at least one object is to provide a rear underbody with the features mentioned at the outset, through which the manufacture of a vehicle on a production line for vehicles of a next larger vehicle class is made possible. In the process, as many parts and components of vehicles of a next larger vehicle class as possible are to be utilizable. In addition, other objects, desirable features and characteristics will become apparent from the subsequent summary and detailed description, and the appended claims, taken in conjunction with the accompanying drawings and this background.

SUMMARY

The rear underbody for a vehicle comprises a rear frame structure and a floor structure forming the floor for the footwell of the rear passengers of the vehicle. Furthermore, the rear underbody comprises a termination structure delimiting to the rear. This termination structure can be designed as so-called heel plate.

Accordingly, the rear frame structure extends forward at least partially as far as over the termination structure. Through this measure use can be made of the concept for the rear structure of the next larger vehicle class and the development effort compared with a complete new development can thus be significantly reduced. Advantages, for example with the crash and endurance development, the tool manufacture and the drawing simulation are obtained.

With the underbody, the usually longer rear frame structure for the larger vehicle of the next higher vehicle class can be integrated without problem, in that the rear frame structure extends forward over the termination structure. Because of this, the underbody according to the invention is a shorter construction than is the case with a vehicle of the next larger vehicle class, with which the rear frame structure usually acts directly on the heel plate and is connected to the latter.

In that the rear underbody can make use of a rear frame structure for vehicles of a next larger vehicle class the assembly is possible on a transport unit of a production line which serves for manufacturing vehicles of larger vehicle classes. This before the background that the rear underbody construction is usually started out from the rear frame structure and the fixing of the underbody to the transport unit is usually carried out via the rear frame structure. To this end, the rear frame structure preferably comprises at least one holder.

Since by means of the underbody according to the invention the construction of the vehicle or motor vehicle can be carried out starting out from the rear frame structure as with a vehicle of a next larger vehicle class, the same or a very similar assembly sequence as with a vehicle of a next larger vehicle class, preferentially on the same production line, can be realized. As a result, the use of many parts and components of the body structure for vehicles of a next larger vehicle class is favored for the production of the vehicle. Merely minor modifications have to be performed on the already available parts and the existing production installations. The underbody according to the invention thus makes possible a particularly cost-effective development and manufacture of a vehicle. The underbody is particularly suitable for a small car. Preferably the small car is a passenger car with four seats, whose footwell per vehicle side has two footrest areas instead of the usual three footrest areas with five-seated vehicles.

According to a first embodiment, it is substantially reducible in its dimensioning in longitudinal direction of the vehicle compared with the dimensioning of the vehicle of a next larger vehicle class. Through the overlapping of the rear frame structure with the floor structure forming the footwell a substantial shortening of the rear underbody can be achieved. For this purpose, the rear frame structure can overlap the floor structure by more than approximately 100 mm, preferentially approximately 200 mm, up to approximately 350 mm.

Preferably, the rear frame structure should protrude into the outer region of the rear footwell in order to guarantee adequate footrest area for rear passengers seated in the back. The rear underbody is therefore suitable for four-seated vehicles or small cars, which already provide an adequately large space in the rear footwell compared with the five-seated vehicles having three footrest areas in the rear footwell.

According to a further embodiment, it is provided that the rear frame structure is connected to the floor structure. Because of this, a durable and stable rear underbody with high torsional stiffness is realized. The measure according to a further embodiment, according to which the rear frame structure is connected to at least one sill structure aims in the same direction.

Preferably, the rear frame structure should be at least connected to an inner sill structure. Inner sill structure as part of the invention is to mean the side of the sill structure facing the footwell or the sill structure facing the footwell.

According to another embodiment, at least one node structure is provided, which is connected to the rear frame structure and the sill structure, more preferably of the inner sill structure, subject to the formation of a hollow space. Because of this, an additional stiffening or stiffening out in the transition of the rear frame structure to the sill structure is realized, so that an improved force introduction into the body structure during a rear-end impact in the event of a crash takes place.

Because of this, an effective occupant protection during a crash is provided. The node structure can be designed as gusset plate, which is formed for example through a profiled and/or formed plate.

It is opportune that the at least one node structure is connected to the termination structure. This measure also aims at stiffening the underbody in the region of the connection of the rear frame structure to the body structure by means of the node structure, in order to make possible an improved force introduction into the body structure in the event of a tail-end impact.

A stiffening effect is also due to the measure of a further configuration of the invention, according to which the rear frame structure on its region which extends at least partially forward as far as over the termination structure comprises a substantially vertical side wall, which on its upper end region is connected to the node structure. Through this measure, the torsional stiffness of the underbody is additionally improved substantially.

It is opportune that the node structure overlaps a vertical side wall of the rear frame structure towards the footwell. As a result, the node structure assumes a protection function for the node structure acts as cover of the vertical side wall towards the footwell, so that rear passengers are protected from injuries on possible sharp edges of the vertical side walls. It is furthermore opportune that the node structure is connected to the floor structure. Because of this, a particularly stiff combination between the rear frame structure and the front body structure is realized, so that as a result a force introduction into the body structure takes place in a particularly effective manner in the event of a tail-end impact.

Through the node structure and the manner of the connection of the node structure to the rear frame structure and the further parts of the rear underbody or of the body structure of the vehicle a combination with high stiffness, particularly torsional stiffness is realized, so that in the event of a tail-end impact the impact energy is introduced into the body structure in a defined manner and thus an effective personal protection in the passenger compartment is guaranteed.

According to a further embodiment, it is provided that seen in vertical direction, with increasing extension of the rear frame structure into the footwell the spacing between the upper termination of the rear frame structure and/or of the node structure becomes smaller. Because of this, a harmonic entry of the rear frame structure into the front frame structure or into the region of the floor structure in the footwell is made possible, so that a step or stair formation in the region of the rear lateral entrance into the passenger compartment for the rear passengers in the back is avoided. Through the harmonic entry the rear frame structure protruding into the footwell is thus accommodated in the footwell in a compact manner and guarantees a large footrest area for the rear passengers in the back.

According to a further embodiment an additional node structure is provided, through which the floor wall of the rear frame structure is connected to the floor structure. The additional node structure is aimed at improving the overall stiffness of the body. To this end, the additional node structure should preferably be connected to the termination structure.

It is also opportune to this end that the additional node structure, the node structure and the floor structure are interconnected in a common connecting region. It is furthermore opportune that the node structure, the additional node structure and the vertical side wall of the rear frame structure form a further hollow space.

Through measures described above a further stiffening of the body, which is also improved with respect to its torsional stiffness, is obtained by means of the additional node structure. The additional node structure and/or the floor structure are preferably formed through at least one plate, more preferably a profiled and/or formed plate.

It is preferably provided that the rear frame structure comprises at least two laterally arranged member profiles between which the termination structure or the heel plate is arranged.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
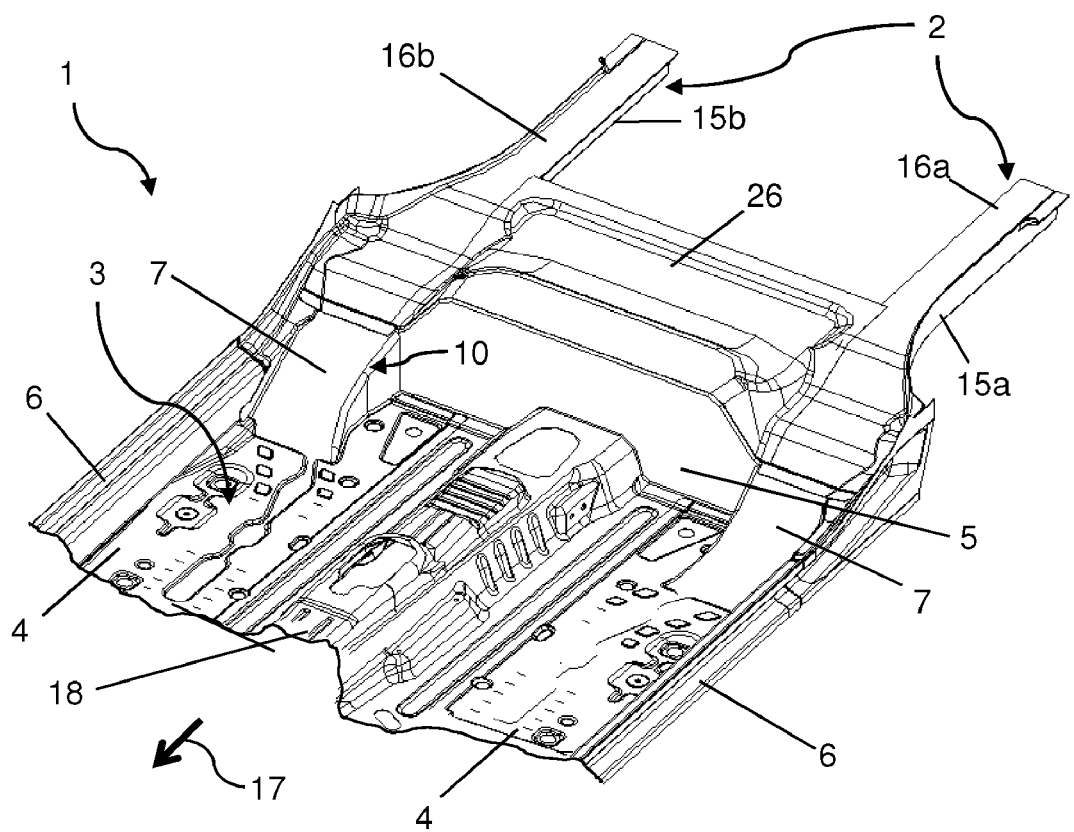
FIG. 1 is a possible embodiment of a rear underbody for a motor vehicle in perspective representation.

FIG. 1 shows, in schematic representation, a possible embodiment of a rear underbody 1 for a vehicle or motor vehicle, more preferably for a passenger car. The rear underbody 1 is particularly suitable for four-seated vehicles, more preferably four-seated small cars. The rear underbody 1 comprises a rear frame structure 2 as well as a floor structure 4 forming the floor for the footwell 3 of the vehicle. Furthermore, the rear underbody 1 has a termination structure 5 delimiting the footwell 3 towards the rear, which is formed through a so-called heel plate.

The construction of the rear underbody 1 is, seen in driving direction 17, arranged in the sequence that the rear frame structure 2 is connected downstream of the floor structure 4, wherein the floor structure 4 ends at the heel plate 5, which represents the end of the footwell 3. The floor structure 4 can, seen in driving direction 17, substantially in the middle region comprise a center console or a tunnel 18, which extends as far as to the heel plate 5, preferably connected to the heel plate 5 in a fixed manner. It is provided that the rear frame structure 2 at least partially extends forward and beyond the heel plate 5. The rear frame structure 2 protrudes at least partially into the rear footwell 3, more preferably into the outer region of the rear footwell 3, so that the floor structure 4 is at least partially overlapped.

The rear frame structure 2 preferably comprises at least two members 15a, 15b. Between the members 15a, 15b the heel plate 5 is arranged, wherein the members 15a, 15b extend forward and beyond the heel plate 5. Seen in driving direction 17, a rear floor 26 or a rear floor panel is provided behind the heel plate 5, which preferably adjoins the heel plate 5. The rear floor is preferably, like the heel plate 5, arranged between the members 15a and 15b. Furthermore, the rear frame structure 2 comprises at least two closing plates 16a, 16b, of which one closing plate 16a or 16b each rest on the associated member 15a or 15b or are fastened thereon.

In the region protruding over the heel plate 5, the rear frame structure 2 is overlapped by a node structure 7, which is preferentially designed as gusset plate. Preferably, each member 15a and 15b of the rear frame structure 2 is assigned such a node structure 7. The node structure 7 comprises a horizontal wall 33 and a vertical wall 34 adjoining thereon, which faces the footwell 3. The course of the horizontal wall 33 and the vertical wall 34 in driving direction 17 is such that with increasing extension of the node structure 7 forward into the footwell 3 the spacing between the horizontal wall 33 and the floor structure 4 becomes smaller. The horizontal wall 33 thus runs, starting from the heel plate 5, obliquely downward in the direction of the floor structure 4. Because of this, the node structure forms an upper termination 10, which makes possible a harmonic transition into the floor structure 4.

Figure 2:
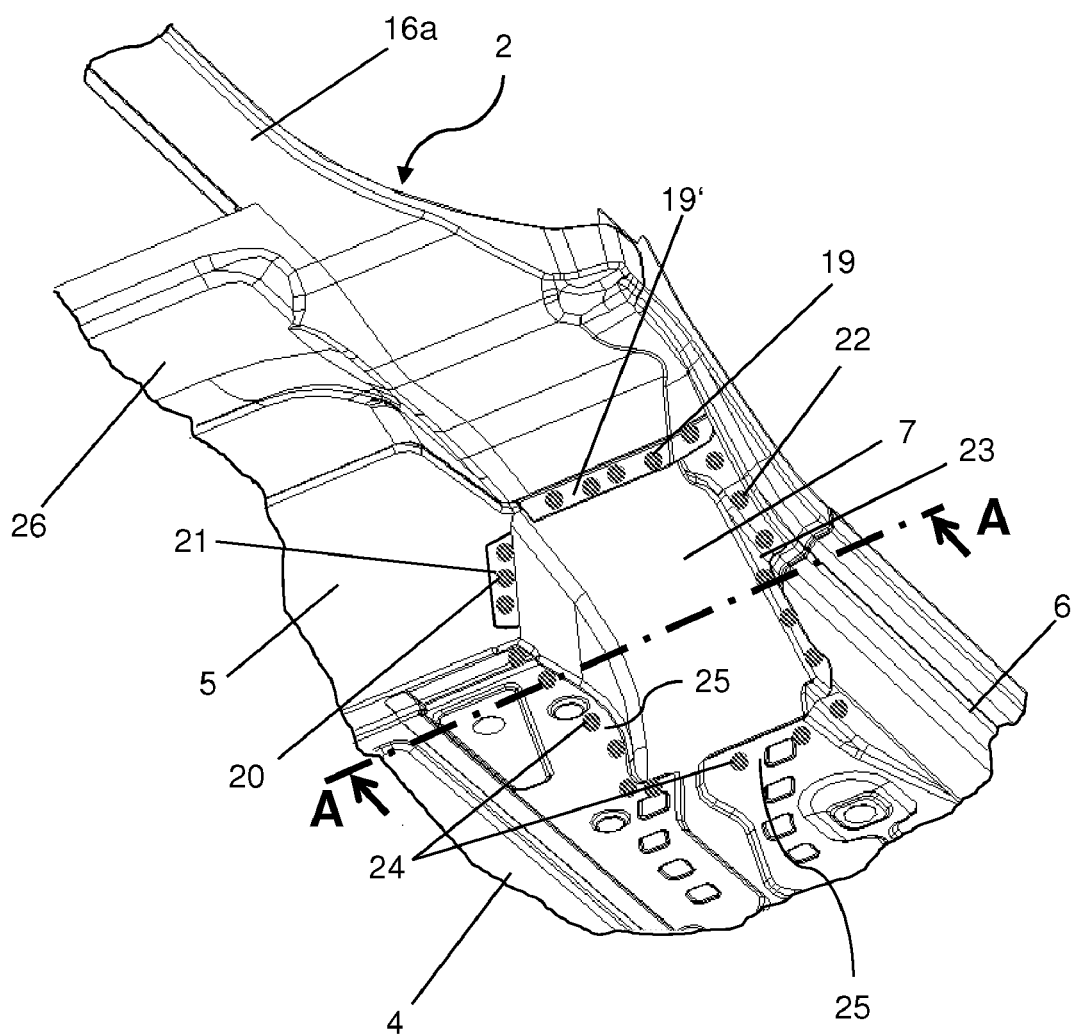
FIG. 2 is the rear underbody according to FIG. 1 as part view of its left side.

FIG. 2 shows a possible embodiment of the node structure 7 and their fixing on the example of the left side of the rear underbody 1 according to FIG. 1 shown in FIG. 2. The node structure 7 is connected to the rear frame structure 2 by means of welding, more preferably by means of spot welding. To this end, at least one flange portion 19' can be formed on the rear frame structure 2 and/or the facing portion of the node structure 7, which for connecting rear frame structure 2 and node structure 7 is provided with spot welds 19. Preferably, the rear frame structure 2 is connected to the node structure 7 in this manner at least via its closing plates 16a, 16b, wherein the flange portion 19' is molded on the associated closing plate.

The node structure 7 is furthermore connected to the inner sill structure 6. Preferably, the node structure 7 to this end comprises a flange portion 23, on which by means of spot welding spot welds 22 for connection to the inner sill structure 6 are placed. The flange portion 23 can be angularly formed at least partially, wherein both legs of the angle are matched to the angular contour of the inner sill structure 6 and each leg is connected to the sill structure 6 in a fixed manner by means of spot welding, as is more preferably evident from FIG. 5.

Furthermore, the node structure 7 is connected to the heel plate 5. To this end, a flange portion 21 can be provided on the node structure 7 and/or on the termination structure 5, which for connecting is provided with spot welds 20. Preferably the node structure 7 is also connected to the floor structure 4. To this end, a flange portion 25 can be arranged along at least one side of the node structure 7, which abuts the floor structure 4 and is welded thereto. With this connection it is also conceivable that the node structure 7 with the floor structure 4 is realized by means of welding, more preferably spot welding through spot welds 24. Preferably, the node structure 7 is connected all round, more preferably through the flange portions 19, 21, 23, 25 to the parts of the rear underbody 1 located in the connecting region, namely the rear frame structure 2, the termination structure 5, the floor structure 4 as well as the inner sill structure 6.

Figure 3:
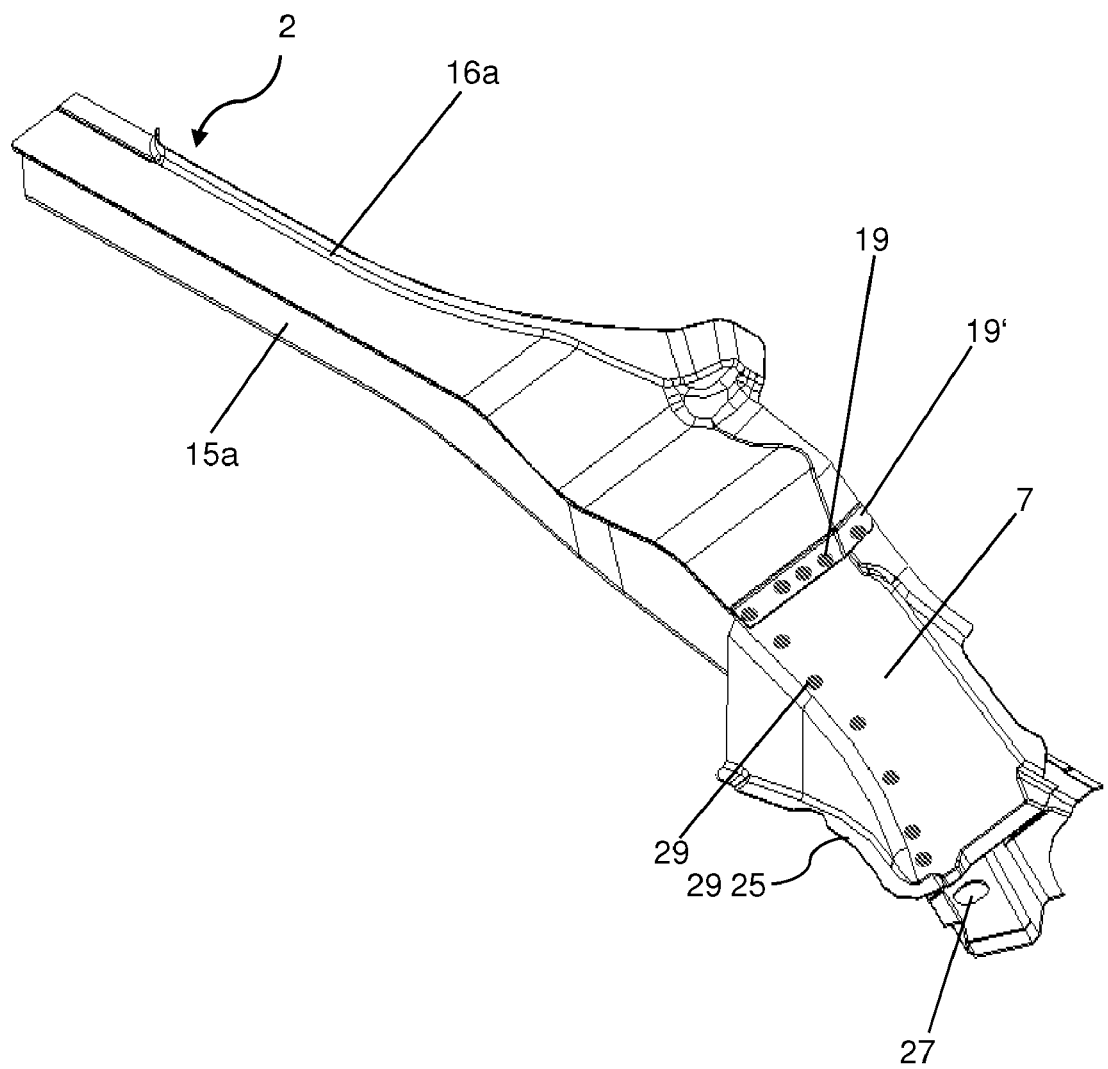
FIG. 3 is the rear frame structure of the left side of the rear underbody according to FIG. 1 in perspective representation.

FIG. 3 shows the node structure 7 and the associated member 15a with closing plate 16a separately from the other parts of the rear underbody 1. As is evident from this, a mounting or holder 27 is provided on the at least one member 15a, in order to be able to fix the rear frame structure 2 on a transport unit (not shown) of a production line. The mounting 27 is preferably designed as at least one through-hole. FIG. 3 shows that preferably also the member 15a of the rear frame structure 2 is connected to the node structure 7 by means of welding, more preferably through spot welds 29.

Figure 5:
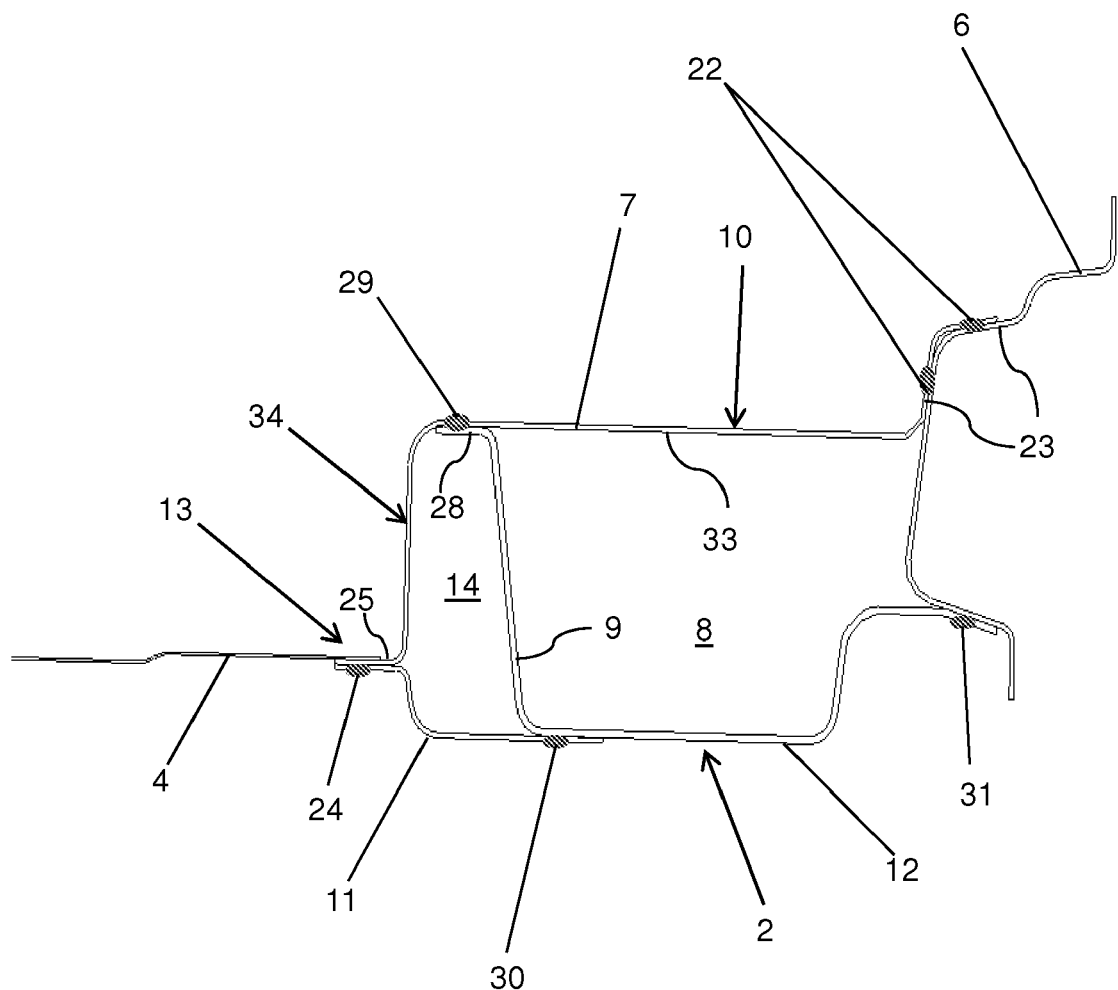
FIG. 5 is the rear underbody according to FIG. 1 in sectional representation along the section line A-A according to FIG. 2.

FIG. 5 shows the rear underbody according to FIG. 1 in sectional representation along the section line A-A according to FIG. 2. As is evident from this, the node structure 7 is connected to the rear frame structure 2 and the inner sill structure 6 subject to the formation of a hollow space 8. To this end, the floor wall 12 of the rear frame structure 2 abuts a surface portion of the inner sill structure 6 with its end region facing the inner sill structure 6, where it is preferably connected to the sill structure 6 by means of welding, more preferably through spot welds 31.

Furthermore, it is evident from FIG. 5 that the rear frame structure 2 at its region extending forward and beyond the termination structure 5 has a substantially vertical side wall 9, which at its upper end region is connected to the node structure 7. To this end, a flange portion 28 can be arranged or molded onto the upper end region of the side wall 9 and/or to the node structure 7, on which the welding together of side wall 9 and node structure 7 is affected.

The rear underbody 1 comprises an additional node structure 11, which is preferably formed through a formed plate part. Through the additional node structure 11 the floor wall 12 of the rear frame structure 2 is connected to the floor structure 4. The additional node structure 11 to this end is preferably connected to the floor wall 12 of the rear frame structure 2 by means of welding, more preferably through spot welds 30.

Preferably, the additional node structure 11 is connected to the floor structure 4 in the connecting region 13, in which the floor structure 4 is already connected to the node structure 7. Preferably, the additional node structure 11 and the node structure 7 form a further hollow space 14 with the vertical side wall 9 of the rear frame structure 2, which adjoins the hollow space 8.

Figure 4:
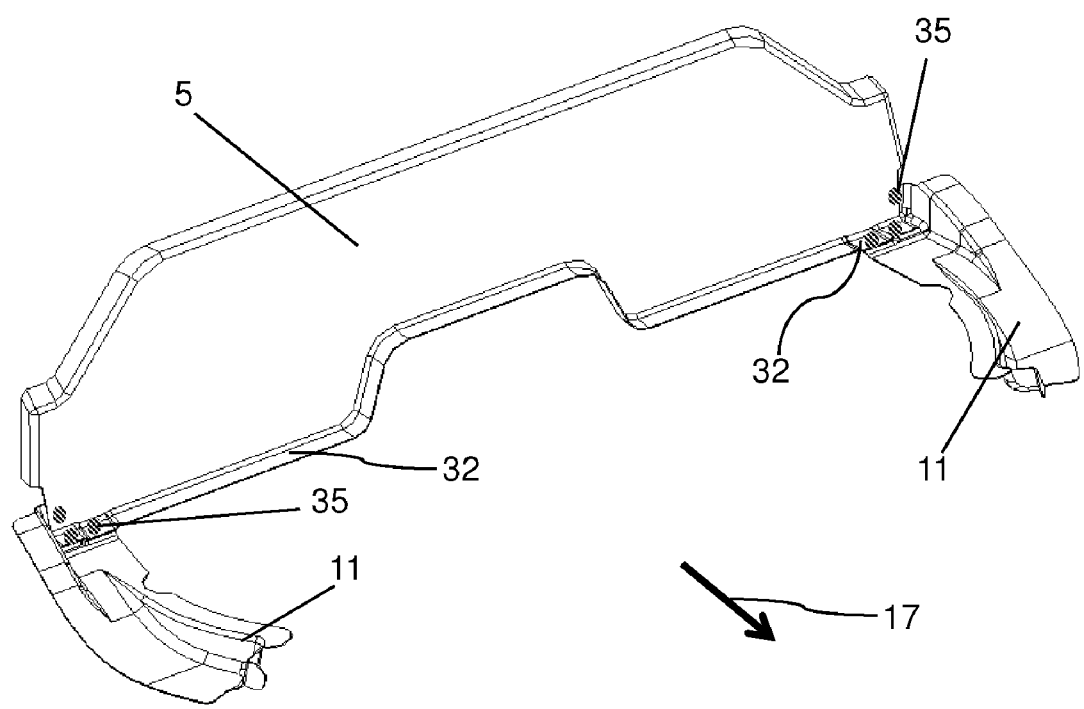
FIG. 4 is the heel plate of the rear underbody according to FIG. 1 with lower gusset plates arranged thereon in perspective representation.

FIG. 4 shows the additional node structures 11 and the heel plate 5. As is evident from this, the additional node structure 11 is preferably also connected to the heel plate 5. To this end, the heel plate 5 preferably at its lower side comprises a flange portion 32 which at least partially runs along the side. Abutting this at an end is a portion of the additional node structure 11 and is connected in a fixed manner by means of welding to the heel plate 5, more preferably spot welding by means of spot welds 35.

The rear underbody as a high overall stiffness, particularly torsional stiffness through which in the event of a tail-end impact an optimum protection of the rear passengers in the passenger compartment is ensured. Through the rear underbody according to the invention it is also ensured that for manufacturing small cars the concept for the rear frame structure of the next larger vehicle class can be utilized. Because of this, the development expenditure, particularly the expenditure during the crash and endurance development, the tool manufacture and the drawing simulation is clearly reduced compared with a complete new development. Already existing parts and manufacturing installations of the next larger vehicle class can be used. To this end, merely minor modifications have to be performed. The rear underbody according to the invention thus makes possible also a cost-effective development and manufacture of a vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A rear underbody for a vehicle, comprising:
a rear frame structure;
a floor structure forming a floor for a footwell; and
a termination structure delimiting said footwell at a rear edge thereof;
a sill structure comprising an inner sill structure, wherein said rear frame structure is connected to said inner sill structure; and
a node structure connected to said rear frame structure and said sill structure to thereby form a hollow space;
wherein said rear frame structure extends at least partially forward and beyond said termination structure and overhangs at least a portion of said floor structure.

2. The rear underbody according to claim 1, wherein said rear frame structure is connected to said floor structure.

3. The rear underbody according to claim 1, further comprising a sill structure, wherein said rear frame structure is connected to said sill structure.

4. The rear underbody according to claim 1, wherein said sill structure comprises an inner sill structure and further wherein said rear frame structure is connected to said inner sill structure.

5. The rear underbody according to claim 1, wherein said node structure is connected to said termination structure.

6. The rear underbody according to claim 1, wherein said rear frame structure, on a region extending at least partially forward and beyond said termination structure, comprises a substantially vertical side wall, which at an upper end region is connected to said node structure.

7. The rear underbody according to claim 1, said rear frame structure comprises a vertical sidewall, and wherein said node structure overlaps said vertical side wall of the rear frame structure towards said footwell.

8. The rear underbody according to claim 1, wherein said node structure is connected to said floor structure.

9. The rear underbody according to claim 1, wherein said node structure comprises horizontal wall section which is connected to said termination structure at an upper termination above said footwell, and which extends forwardly to said floor structure forming a space within said node structure, and further wherein the height of said space between said horizontal wall and said floor structure within said node structure decreases in a forward direction between said upper termination and said floor structure.

10. The rear underbody according to claim 1, wherein said node structure comprises a horizontal wall section which is connected to said rear frame structure, at an upper termination above said footwell, and which extends forwardly to said floor structure forming a within said node structure, and further wherein the height of said space between said horizontal wall and said floor structure within said node structure decreases in a forward direction between an upper termination and said floor structure.

11. The rear underbody according to claim 1, further comprising an additional node structure through which said rear frame structure is connected to said floor structure.

12. The rear underbody according to claim 11, wherein said node structure, said additional node structure, and said floor structure are interconnected in a common connecting region.

13. The rear underbody according to claim 11, wherein said additional node structure is connected to said termination structure.

14. The rear underbody according to claim 11, wherein said rear frame structure further comprises a vertical side wall, and further wherein said node structure, said additional node structure, and said vertical side wall form a further hollow space.

* * * * *